United States Patent [19]

Yoshioka et al.

[11] Patent Number: 5,417,579
[45] Date of Patent: May 23, 1995

[54] FEEDING CONNECTOR

[75] Inventors: Nobuaki Yoshioka; Toshiaki Hasegawa, both of Haibara, Japan

[73] Assignee: Yazaki Corporation, Tokyo, Japan

[21] Appl. No.: 305,656

[22] Filed: Sep. 14, 1994

[30] Foreign Application Priority Data

Sep. 20, 1993 [JP] Japan ................................. 5-233409

[51] Int. Cl.$^6$ ............................................. H01R 13/62
[52] U.S. Cl. ................................... 439/310; 439/372
[58] Field of Search .................... 439/32, 48, 135, 136, 439/142, 310, 352, 353, 357, 358, 372

[56] References Cited

U.S. PATENT DOCUMENTS

| | | | |
|---|---|---|---|
| 4,509,807 | 4/1985 | Reimpell et al. | 439/32 |
| 4,722,697 | 2/1988 | Naruse et al. | 439/310 |
| 4,952,160 | 8/1990 | Olsen | 439/142 |
| 5,350,312 | 9/1994 | Kino et al. | 439/310 |

Primary Examiner—Khiem Nguyen
Attorney, Agent, or Firm—Armstrong, Westerman, Hattori, McLeland & Naughton

[57] ABSTRACT

The feeder connector consists of feeding-side and receiving side connectors, wherein the feeding-side connector consists of a connector body slidably installed in a front half section of a cylindrical-shape casing, and a handle movably mounted in a rear half section of the casing such that it advances to push the connector body against the receiving-side connector in accordance with a rotational movement of a lever. To the lever there are provided; a primary locking means for locking the lever such that the connector body and the mating connector body are maintained engaged with each other, a secondary locking means for locking the primary locking means in the locked state, which secondary locking means comprising an electromagnetic coil, and a means for releasing the lever from a primarily locked state thereof after the primary locking means is released from said secondary locking means through de-energizing of the electromagnetic coil. In addition, the feeding-side connector further comprises a preliminary fitting means for preliminarily fitting the casing to the receiving-side connector before connecting it to the receiving-side connector, and also a stopping means for hampering the connector body from moving forward to be connected to the receiving-side connector before being fitted thereto.

8 Claims, 9 Drawing Sheets

FEEDING CONNECTOR

BACKGROUND OF THE INVENTION

1. Field of the Invention

The present invention relates to a feeder connector used for charging an electric vehicle or the like, and more particularly to a feeder connector in which the feeding-side and receiving-side connectors thereof are easily fitted and connected and reliably prevented from accidental detachment during the feeding operation, and which also enables a secure prevention of an inadvertent rotation of a lever in the feeding-side connector when these connectors are not fitted yet.

2. Description of the Prior Art

Figure 9:
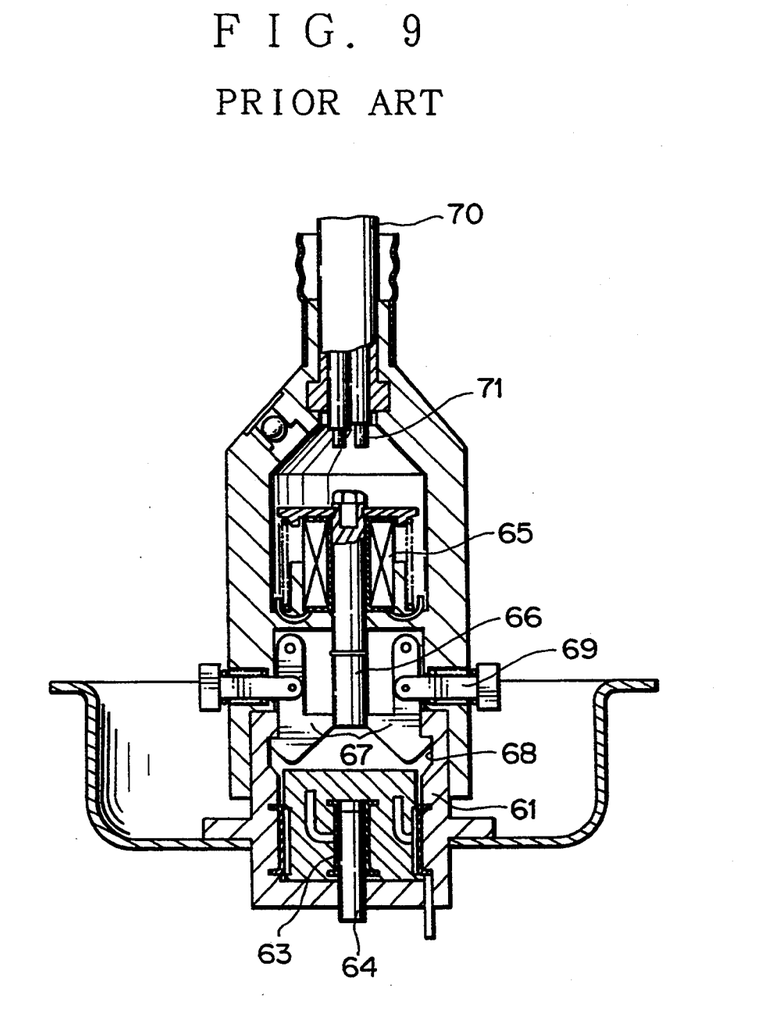
FIG. 9 is a sectional view of a conventional feeder connector with its feeding-side and receiving-side connectors shown in a separated state.
Figure 10:
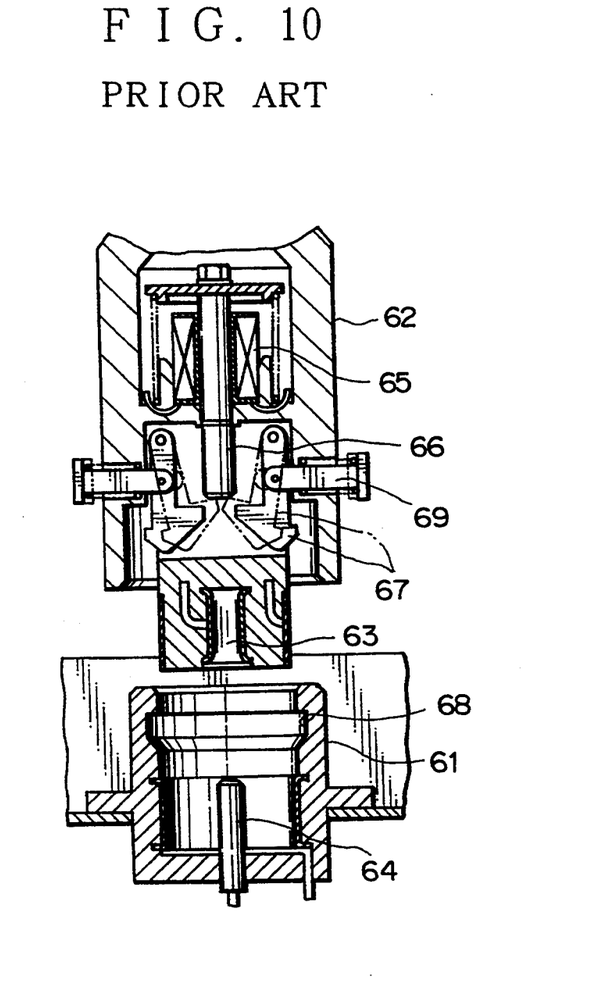
FIG. 10 is a sectional view of the feeder connector of FIG. 9 with the feeding-side and receiving side connectors in a fitted state.

A conventional feeder connector is illustrated in FIGS. 9 and 10 as disclosed in Japanese Patent Publication No. 60-24539, wherein the feeder connector consists of a female connector (receiving-side connector) 61 fixed to the body of an automobile or the like and a cylindrical-shaped male connector (feeding-side connector) 62 provided on the side of a feeder apparatus.

As shown in the figures, when male connector 62 is fitted in female connector 61, a pair of locking pieces 67, 67 of the male connector are engaged with an annular groove 68 of the female connector, and simultaneously female and male terminals, respectively 63 and 64, are fitted and connected to each other. Then, when the feeding operation is started, an electromagnetic coil 65 is energized and accordingly a plunger 66 is sent down to such a position where the pair of locking pieces 67, 67 are locked, so that the male and female connectors cannot be detached during the feeding operation. On completion of the feeding operation, an electromagnetic coil 65 is de-energized to allow a plunger 66 to go upwards to a non-locking position, and the connectors may be separated from each other by pressing disengagement members 69 and releasing locking pieces 67 from the annular groove 68.

In summary, in the conventional feeder connector as constructed above, the pair of locking pieces 67, 67, electromagnetic coil 65 and a plunger 66 are all provided on the fitting axis of the connectors. As a result, they interfere with the exit (wiring path) of lead wires 71 of a cable 70, making the feeder connector complicated inside and large-sized, whereby it has been a difficult problem to settle a multi-polarization of the connectors suitable to form control circuits such as display circuit and signal circuit other than the power feeding circuit.

SUMMARY OF THE INVENTION

The present invention has been made to eliminate such problems as described, and it is a first object of the present invention to provide a feeder connector in which mating connectors are easily fitted and connected, which has a simplified inner structure suitable for multi-polarization and which also securely prevents detachment of the mating connectors during the feeding operation.

Another object of the present invention is to provide a feeder connector, in which only when the feeding-side and receiving-side connectors are in a preliminarily fitted state, a lever for engaging the connector body of the feeding-side connector with the opposing receiving-side connector can be rotated, so that an inadvertent rotation of the lever can be completely eliminated when feeding is not performed.

In order to achieve the first object of the present invention, there is provided a feeder connector including, a feeding-side connector provided on the side of a feeder apparatus and a receiving-side connector provided on a vehicle body or the like, the feeding-side connector comprising; a cylindrical-shape casing, a connector body slidably installed in a front half section of the casing and accommodating a plurality of terminals, a handle mounted in a rear half section of the casing, a lever with an intermediate portion thereof rotatably supported inside the casing, the lever including a working portion pivotably attached to the handle or to the connector body and an operating portion extending outside the casing, the lever, when rotated, causing the handle to move forwardly to bring the connector body into engagement with a mating connector body of the receiving-side connector, a primary locking means that locks the lever in such a position that the connector body and the mating connector body are maintained engaged with each other, a secondary locking means that locks the primary locking means through energizing of an electromagnetic coil, and a means for releasing the lever from the primary locking means after the lever is released from the secondary locking means through de-energizing of the magnetic coil.

It is preferable that the handle is made in a pipe-like shape mounted in a rear half section of the casing, coaxially slidable with the connector body, and it passes lead wires connected to the plurality of terminals therethrough.

On the other hand, in order to achieve the second object of the present invention, there is provided a feeder connector including, a feeding-side connector provided on the side of a feeder apparatus and a receiving-side connector provided on a vehicle body or the like, the feeding-side connector comprising; a cylindrical-shape casing, a connector body slidably installed in a front half section of the casing and accommodating a plurality of terminals, a handle mounted in a rear half section of the casing, a lever with an intermediate portion thereof rotatably supported inside the casing, the lever including a working portion pivotably attached to the handle and an operating portion extending outside the casing, the lever, when rotated, causing the handle to move forwardly to bring the connector body into engagement with a mating connector body of the receiving-side connector, a locking means that locks the lever in position such that the connector body and the mating connector body are maintained engaged with each other and having a release lever at one end thereof, and a preliminary fitting means for preliminarily fitting the casing to the receiving-side connector before connecting the connector to the receiving-side connector; wherein the preliminary fitting means further includes a stopping means for hampering the connector body from moving forward to be connected to the receiving-side connector, and wherein an intermediate portion of the preliminary fitting means is axially supported within the casing, and contains a locking claw at one end thereof, while an engagement piece at the other end thereof that rotates by an activation of the release lever.

By the feeder connector aiming at the first object of the present invention, when the lever is rotated towards the handle by hand, the handle moves forward to press the connector body of the feeding-side connector against the receiving-side connector, whereby the feeding-side and receiving-side connectors are very easily fitted and connected. During the feeding operation, the lever that causes the handle to move forward or retract is doubly locked by the primary and secondary locking means. Further, detachment of the connectors is performed in the order of de-energizing electromagnetic coil, releasing the secondary locking, and releasing the primary locking, thereby excluding detachment of the connectors during feeding. This handle has a pipe-shaped configuration through which the lead wires of a plurality of terminals accommodated in the connector body are allowed to pass and is advantageously employed in wiring a multiplicity of lead wires or multi-polarization. The feeder connector of this invention does not require large force since the mating connectors are fitted by a lever, has a relatively simple inner structure and may easily be miniaturized owing to the handle that also serves as through-pipe for the lead wires.

By the feeder connector for obtaining the second object of the present invention, since only when the feeding-side connector is preliminarily temporarily engaged with the receiving-side connector, a stopping means to prevent the main body of the feeding-side connector from advancing is released, and thus the connector body can move, or a rotation of the lever can be performed, whereby an inadvertent rotation of the lever can be avoided when the connectors are not fitted with each other.

Other objects and features of the invention will now be more fully understood from the following detailed description and appended claims when taken with the accompanying drawings.

DETAILED DESCRIPTION OF THE PREFERRED EMBODIMENTS

In the following, one embodiment of the present invention will now be described with reference to the accompanying drawings.

As shown in FIGS. 1 to 5, a feeder connector according to the present invention is composed of a feeding-side male connector A provided on the side of a feeder apparatus (not shown) and a receiving-side female connector B which is fixed to the body of an automobile or the like.

Figure 1:
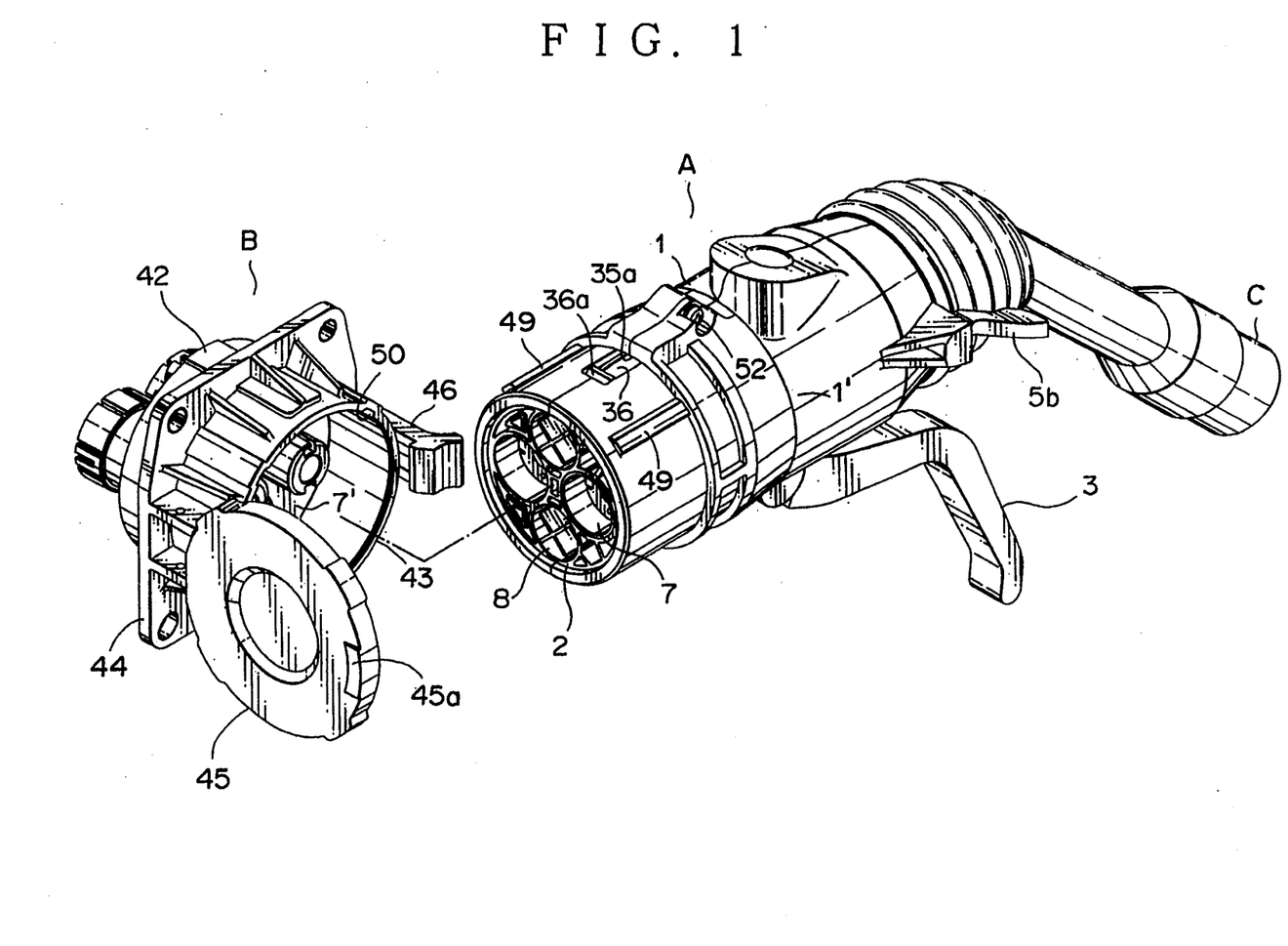
FIG. 1 is a general perspective view of a feeder connector of the present invention, wherein the two mating connectors A and B are separated from each other.
Figure 3:
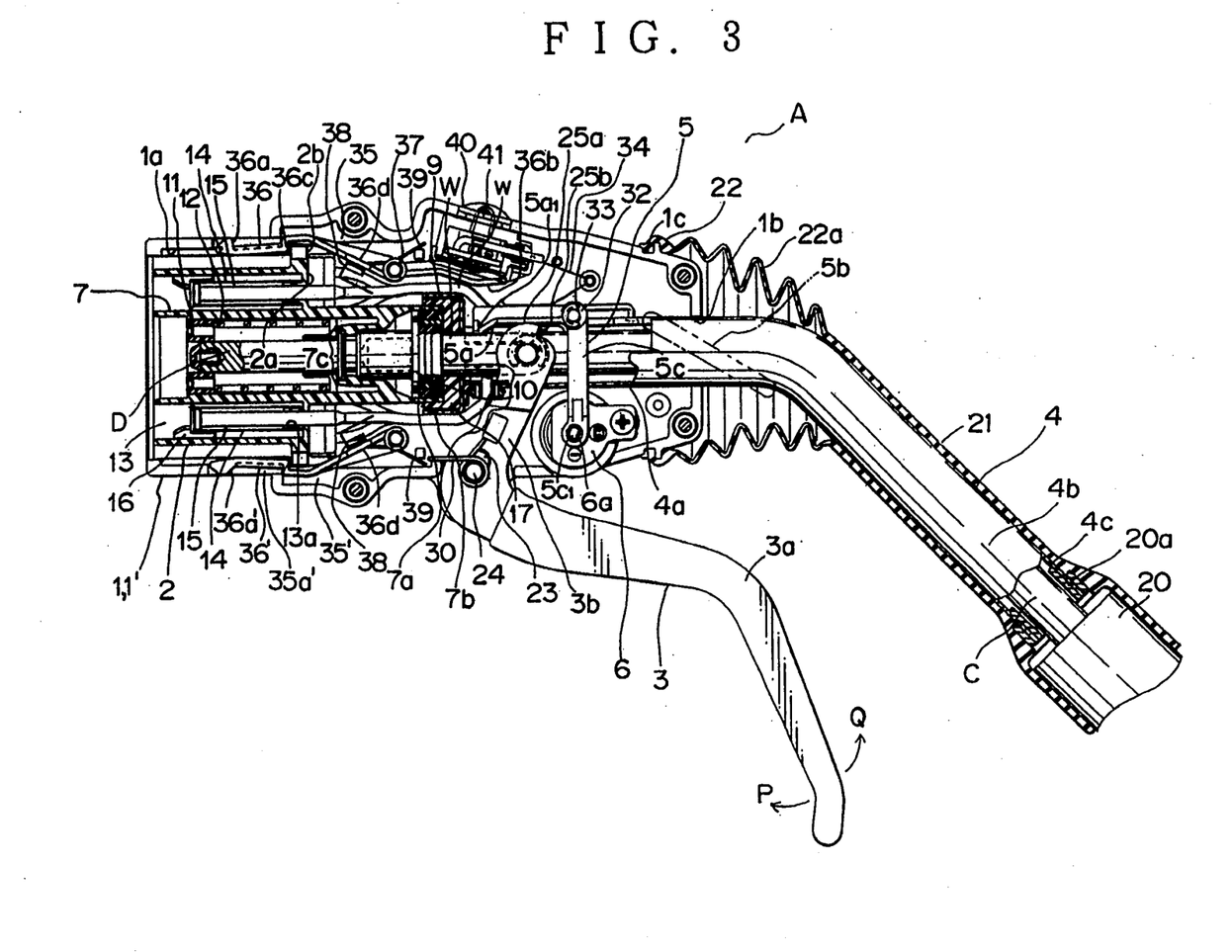
FIG. 3 is a longitudinal sectional view of the feeding-side connector A of FIG. 1.
Figure 4:
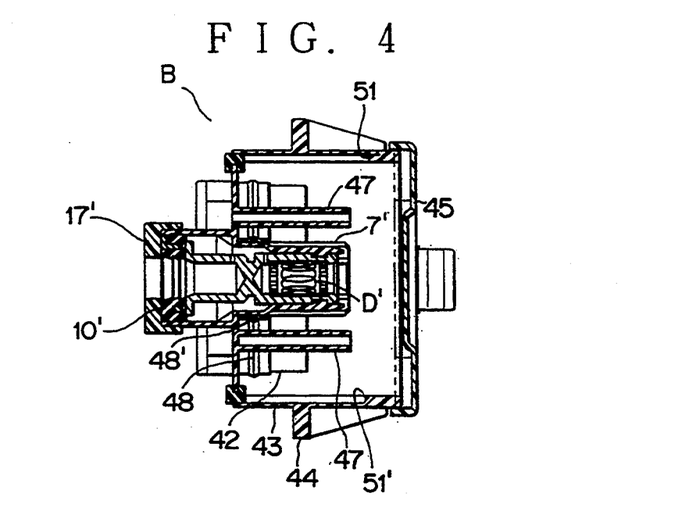
FIG. 4 is a sectional view of the power-receiving side connector B of FIG. 1.

The feeding-side connector A is provided with a casing 1 consisting of a pair of opposing split-type casings 1 and 1' facing to each other, wherein a connector body 2 is slidably installed inside a front half section of casing 1, and mounted in a rear half section of the casing 1 are a handle that is reciprocally provided in such a form as to push the connector body 2 by rotating the lever 3 to move forward to the receiving-side connector B and also a release lever 5 for primarily locking the lever 3 and an electromagnetic coil 6 for secondarily locking the release lever 5, and further, at the rear end of the handle 4 itself there is a cable C extending from a feeder apparatus (not shown).

Figure 2:
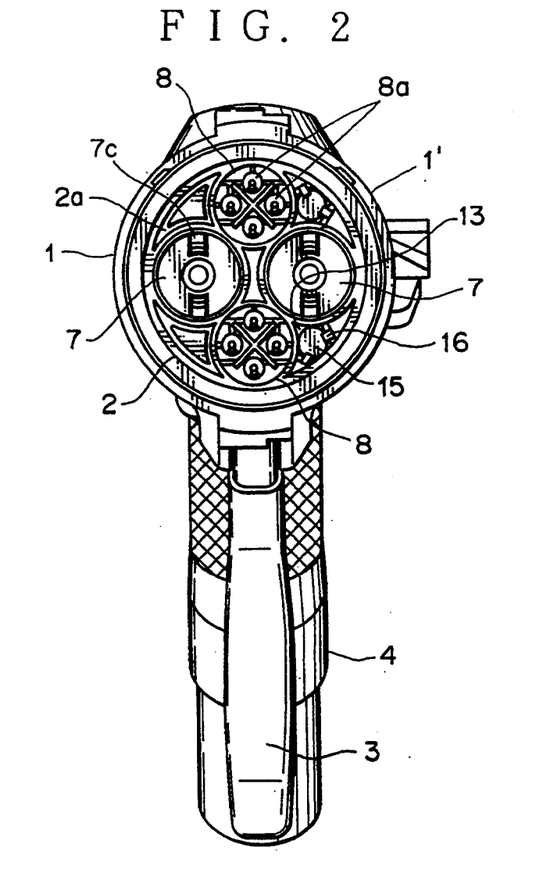
FIG. 2 is a front view of the power-feeding side connector A of FIG. 1.

The connector body 2 is of a cylindrical body, and as shown in FIG. 2, there are provided a pair of long-diametrical terminal accommodating chambers 7, 7 in the left and right side therein, and a pair of multi-terminal accommodating chambers 8, 8 in the upper and lower sides therein both protrudedly provided from the bottom wall 2a. Each of the terminal accommodating chambers 7, 7 is, as shown in FIG. 3, provided with a wall 7a rearwardly protruding from the bottom wall 2a, and a pressing plate 9 formed at the front end portion of the handle 4 is abutted to the receiving seat 7b formed around the external periphery of the wall 7a. Inside the terminal accommodating chambers 7, 7, a male terminal D for feeding electricity is fixedly accommodated by a pair of resilient locking arms 7c, whereas within four cavities 8a formed in each of the multi-terminal accommodating chambers 8, 8, a male terminal (not shown) for signal, indication control circuit or the like is fixedly accommodated. These male terminals including D are connected with the lead wires W, w extended from the cable C by crimping or other known means, and fitted over by a water-proof rubber plug 10 for water proof sealing in order to prevent a short circuit between neighboring ones of the terminals. Further, an inner lid 11 which is slidable in the axial direction is inserted and locked at the front end portion of the terminal accommodating chamber 7, and a coil spring 12 is interposed between the inner lid 11 and the terminal accommodating chamber 7.

Also at the rear end portion of the external periphery of the connector body 2, a flange 2b which is slidably contacted to the inner wall 1a of each of the cases 1, 1' is annularly mounted, pin accommodating sections 13, 13 are formed between the terminal accommodating chamber 7 and multi-terminal accommodating chamber 8, and within each of the pin accommodating sections 13, 13, a movable pin 15 which is urged in the forward direction by a coil spring 14 is slidably installed through a gear hole 13a of the bottom wall 2a. In addition, reference numeral 16 denotes a stopper for the movable pin 15, and 17 denotes a rear holder to prevent the male terminal D from rearwardly coming off.

Handle 4 has a pipe-like shape which consists of a straight tube section 4a at the front half portion and a slant tube section 4b at the latter half portion thereof, serving also as a protector for lead wires W, w of the cable C. The straight tube section 4a is slidably supported by an opening 1b formed at the rear end of the casing 1, while at the rear end portion of the slant tube section 4b a locking hole 4c is formed, and a protection case 20 of the cable C is locked by a locking piece 20a. Denoted 21 is a grip composed of an elastic material such as synthetic rubber, which has a water-proof cap 22 formed integrally therewith at the front end via a bellows 22a, the waterproof cap being fitted in an annular groove 1c at the rear end of casing 1.

Figure 5:
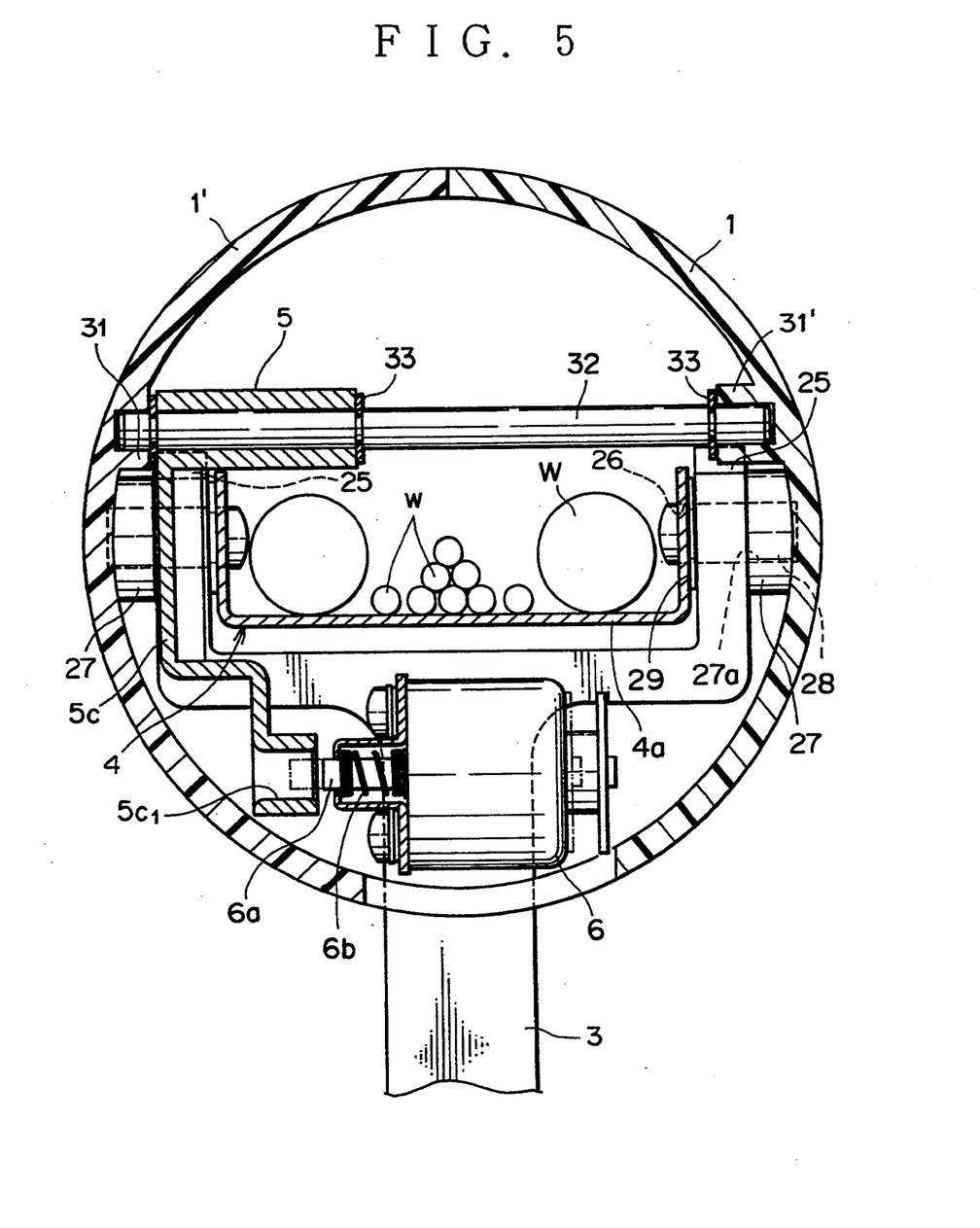
FIG. 5 is a sectional view showing an important part of the mounting structure of the lever 3 and a release lever 5 of FIG. 3.

Lever 3 is formed in an elongated operating portion 3a and shorter working portion 3b to form an L shape. Working portion 3b also contains an elongated hole 23 formed at a base portion thereof that adjoins operating portion 3a and is pivotably supported by a lever shaft 24. The distal end of lever 3 is bifurcated to form two supporting pieces 25, 25 as shown in FIG. 5, which supporting pieces are rotatably supported by a radial hole 26 formed at the side wall of the straight tube section 4a of the handle 4 and a pin 28 inserted through an elongate hole 27a of the boss 27 which is protrudedly formed on the inner wall of the casing 1 (1'). Denoted 29 is a stop ring for pin 28. Further, supporting piece 25 is provided with a circular arc end face 25a, and this circular arc 25a is further provided with a locking step 25b formed on the end face for engagement with a locking projection 5a1 of a later-described release lever 5, and lever 3 is urged in the direction P by a returning coil 30 which is engaged with lever shaft 24.

Release lever 5 is composed of a working arm 5a extended in the axial direction of connector body 2, an operating arm 5b projecting in the external rearward direction of the casing 1 (1'), and a locking arm 5c which is perpendicularly extends downward from the intermediate portion between arms 5a and 5b, forming altogether a substantial T form, and the intermediate portion of these arms 5a to 5c is, as shown in FIG. 5, rotatably supported at the upper portion of handle 4 by a pin 32 which is inserted into a pair of bosses 31, 31 formed in the inner wall of casing 1 (1') and stop rings 33, 33. The working arm 5a is provided in such a way that its lower surface is slidably contacted to the before mentioned circular arc 25a of lever 3, and its front end portion is formed with a locking projection 5a1 to be engaged with locking step 25b. This working arm 5a is urged toward the circular arc 25a by a spring coil 34 formed on the inner wall of casing 1'. Locking arm 50 comprises a locking hole 5c1 at its lowest portion, and an electromagnetic coil 6 having a plunger 6a and a coil spring 6b and facing against the locking hole 5c1 is fixed on the inner wall of casing 1'. When electromagnetic coil 6 is energized by a perfect engagement of the feeding-side connector A and the receiving-side connector B, plunger 6a is extended to be inserted into locking hole 5c1, the release lever is locked, and de-energized when the feeding is finished, and plunger 6a is retreated momentarily by an urging force of coil spring 6b to release the locked state.

Further, locking chambers 35, 35' are formed bulgedly on the upper and lower sides in the intermediate portion of casing 1 (1'), respectively and extending over front side connector body accommodating section with openings 35a, 35a' formed at their front ends. Denoted 36, 36' are locking arms for locking the feeding-side and receiving-side connectors A and B to each other. In locking chamber 35, locking arm 36 is supported at its intermediate portion on a pin 37, extends forwardly to the outside of the locking chamber through opening 35a, has a hook-like locking claw 36a projected at the front end, and rearwardly extends to form an engagement piece 36b for working arm 5a of release lever 5. Looking arm 36 is also formed between pin 37 and locking claw 36a with a locking step 36c outwardly bent, and a spring locking section 36d having a U-shape sectional surface facing toward connector body 2, wherein spring locking section 36d is further formed with a plate-type spring 38 facing the before-mentioned movable pin 15. The other locking arm 36', likewise extends forwardly to the outside of casing 1 through opening 35a', has a so-called semi lock-type locking claw 36a' projected at the front end, and is, in locking chamber 35', supported at the rear end on a pin 37', which is just like locking arm 36 except that it lacks an engagement piece 36b. These locking arms 36, 36' are inwardly urged respectively by a coil spring 39.

It is to be noted that there is bulgedly provided a LED accommodating section 40 in the rear side of the upper locking chamber 35, wherein an LED 41 for indicating that the power is being fed is disposed.

Receiving-side connector B is constructed as shown in FIGS. 1 to 4 in such a way that it includes a connector body 42 with female terminal D' corresponding to male terminals D contained and locked therein, and a shell 43 sealingly fitted on the outer periphery of the connector body 42 for receiving a front end portion of casing 1 of the feeding-side connector A. Shell 43 is, via a flange 44 circumferentially formed around the outer periphery thereof, bolted (not shown) to an automobile body, and its open end is opened or closed by a cap 45 hinged to the shell via a pin (not shown), wherein the cap is adapted to be locked through engagement between a locking member 45a and a locking arm 46 formed on the outer periphery of shell 43 respectively. Further, the connector body 42 is protrudedly formed with activating bosses 47, 47 corresponding to the before-mentioned movable pins 15, 15 of the feeding-side connector A. Reference numeral 7' denotes a terminal accommodating chamber, 10' denotes a water-proof rubber plug, and 17' denotes a rear holder, providing a similar structure to that of the feeding-side connector A, and thus a detailed explanation thereof is omitted here. Numerals 48, 48' indicate packings for the water-proof sealing.

For correct positioning of feeding-side and receiving-side connectors A and B to be fitted with each other, casing 1 is formed on an outer surface thereof with axially extending projected strips 49 and shell 43 is formed on an inner surface with guiding grooves 50. Shell 43 is further formed with locking steps 51, 51' which are to be mated with locking arms 36, 36' of the feeding-side connector A. Denoted 52 in FIG. 1 is a screw for fastening split-type casings 1 and 1'.

While the feeding-side connector A has been described above as containing male terminal D and the receiving-side connector B as containing female terminal D', the connector bodies 2 and 42 may be changed in design so that the male and female terminals are reversely contained.

With the construction as disclosed above, when the feeding-side connector A is not fitted to the receiving-side connector B, the flange 2b formed at the rear end of the external periphery of the connector body 2 is fitted with locking step 36c of the respective locking arms 36, 36' which are urged by the spring coil 39, so that the movement of the connector body 2 in the forward direction is hampered and thus the rotation of lever 3 in the direction indicated by an arrow Q is also hampered.

Figure 6:
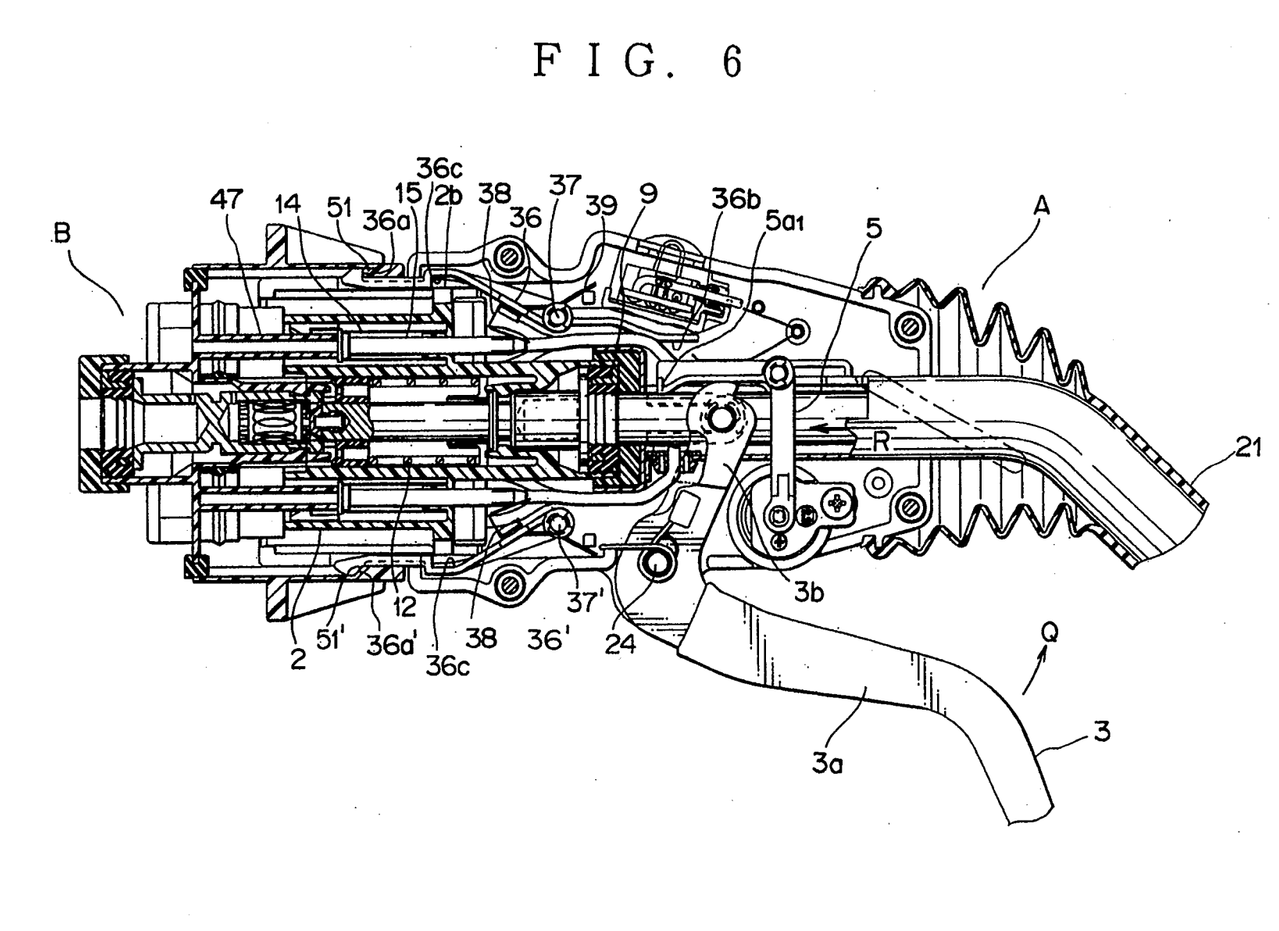
FIG. 6 is a longitudinal sectional view of the connectors A and B in a temporarily fitted state.

FIG. 6 shows a state that the feeding-side connector A and the receiving-side connector B are preliminarily fitted with each other. In an engagement of the both connectors, casing 1 (1') of the feeding-side connector A is inserted into shell 43, with the projected strips 49 on the casing put in the corresponding guide grooves 50 on the inner surface of the shell, whereby distal portions of respective locking arms 36, 36' are outwardly rotated centering around pins 37, 37' by way of plate-type coil 38, and thus, locking claw 36a and semilock-type locking claw 36a' are respectively engaged with locking steps 51, 51' to preliminarily lock the connectors A and B to each other.

Figure 7:
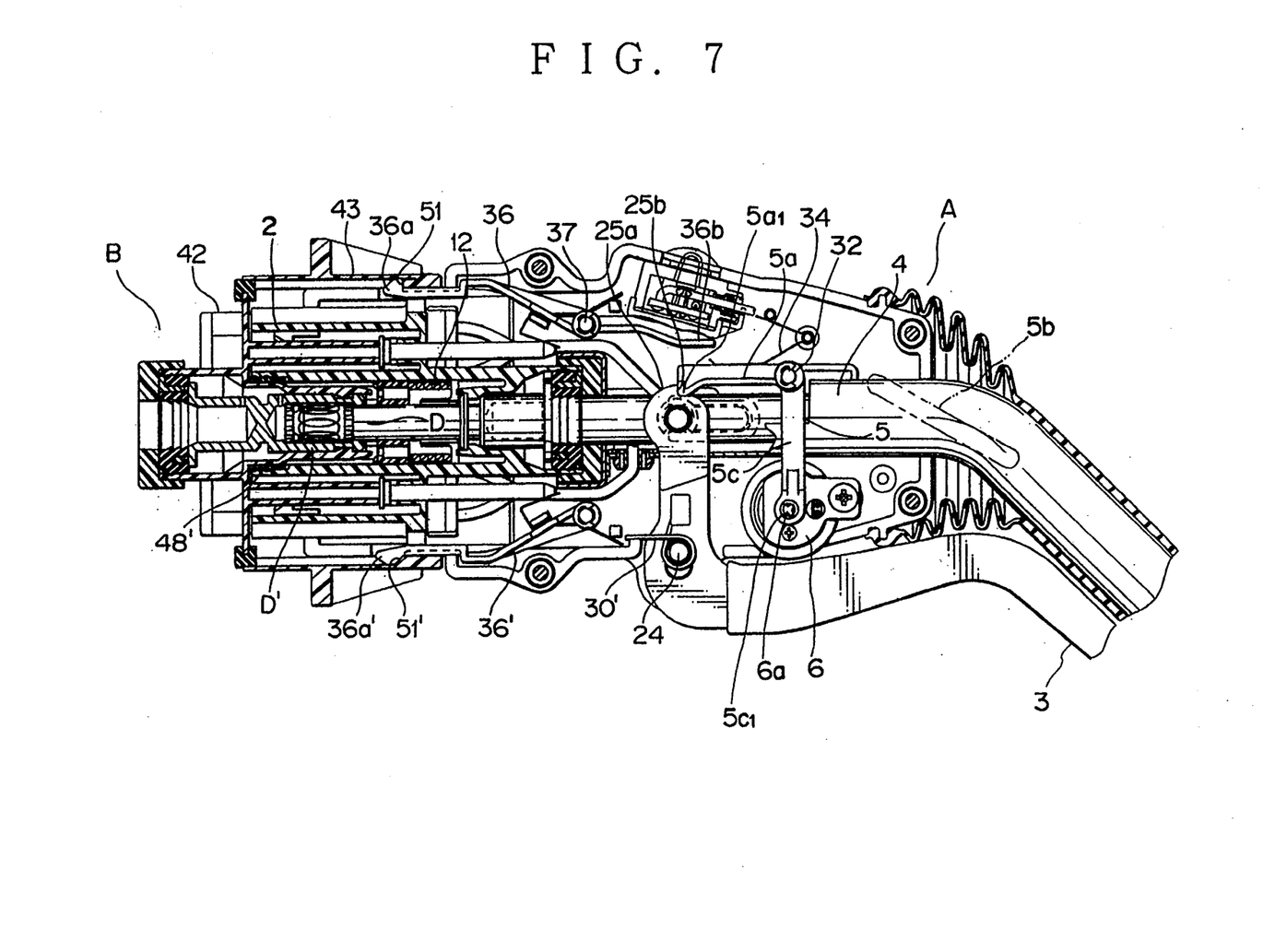
FIG. 7 is a side sectional view of the connectors A and B in a perfectly fitted and locked state.

In this situation above, if the operating portion 3a of the lever 3 is taken hold of and rotated in the direction of arrow Q so as to cause the working portion 3b to rotate around a lever shaft 24 and the handle 4 to advance as a whole in the direction of arrow R. As a result, connector body 2 is, via plate 9, pushed forward against the elastic action of coil spring 12, and accordingly the both connectors A and B, namely connector bodies 2 and 44 are fully fitted as shown in FIG. 7, resulting that the male terminal D and female terminal D' are fully connected with each other.

In the coupling process of the preliminary engagement of these connectors A and B to the mutual perfect engagement thereof, as lever 3 rotates in the direction of arrow Q, circular arc end surface 25a formed at the top end thereof is slidingly contacted with the underside of the working portion 5a of release lever 5, thereby rotating the working portion 5a upwardly against the urging force of the coil spring 34, so that on completion of the coupling, as the circular arc end face 25a mounts over the locking projection 5a1, the working arm 5a returns to the original position by coil spring 34 momentarily to engage locking projection 5a1 with locking step 25b, thereby to lock lever 3 by release lever 5 to obtain the primary locked state thereof.

Figure 8:
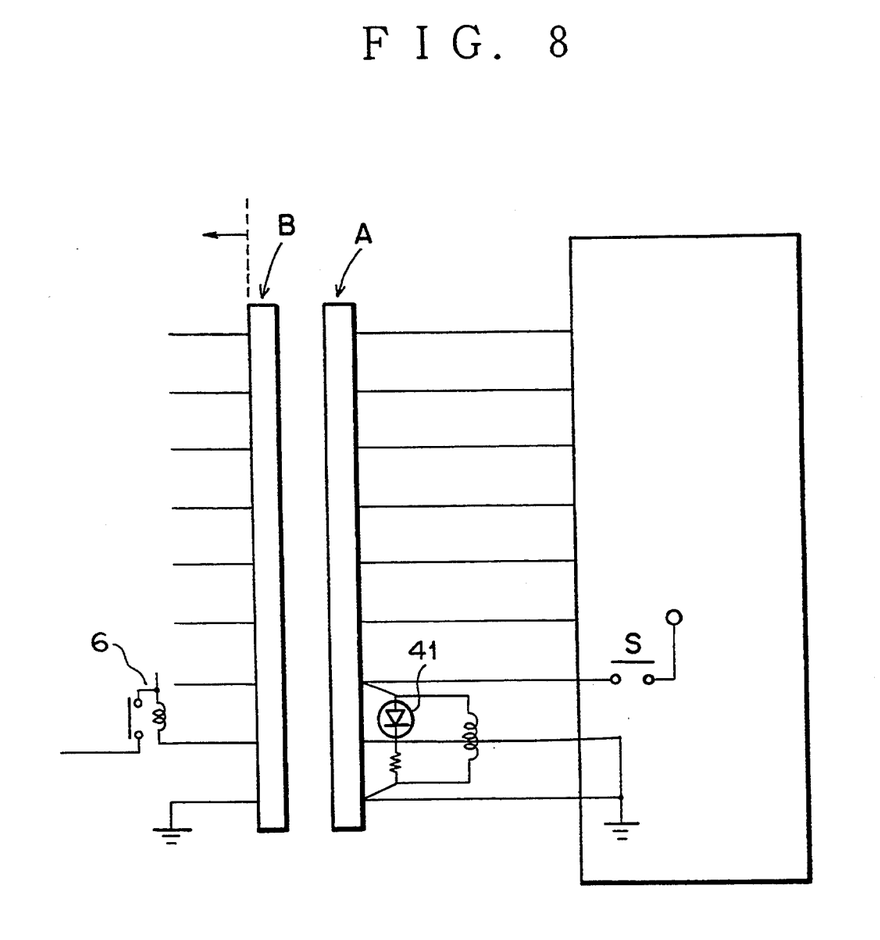
FIG. 8 is a schematic view showing an electric circuit of the feeding-side connector according to the present invention.

In the perfectly coupled state of the connectors A and B, if a switch S is turned on as shown in the circuit diagram of FIG. 8, LED 41 lights up and simultaneously electromagnetic coil 6 is energized, thereby moving the before-mentioned plunger 6a (shown in FIG. 5) into engagement in the locking hole 5c1 formed in locking arm 5c of release lever 5 to obtain the secondary locked state thereof. By this operation above, lever 3 is locked not only by release lever 5 but doubly locked. Consequently, even when the operating arm 5b of release lever 5 is inadvertently pressed down to release the locked state during the feeding operation, lever 5 is still maintained in the locked state by plunger 6a of electromagnetic coil 6, thereby securely preventing the detachment during the feeding operation.

The release of locking and detachment can be performed as below. When the feeding operation is finished, the electromagnetic coil 6 is de-energized by the before-mentioned control circuit, whereby plunger 6a is momentarily returned to the original position by coil spring 6b to detach from locking hole 5c1, thereby to release the secondary locking of release lever 5.

Thereafter, operating portion 5b of release lever 5 extending outside the casing 1 is rotated downwardly to release it from lever 3 or locking step 25b of lever 3. This allows connector body 2 to part from the mating connector body 42 by the action of coil spring 12 and returning coil 30 of lever 3, so that lever 3 also returns to its original position. As operating arm 5b of release lever 5 is further rotated downwardly, the working portion 5a raises engagement piece 36b locking arm 36 centering around pin 37 so as to lower locking claw 36a at the opposite side. Consequently, locking claw 36a is disengaged from locking step 51 on the inner surface of shell 43. The other locking claw 36a' of locking arm 36' that engages locking step 51 is of a semi lock-type and may be easily disengaged on drawing the feeding-side connector A.

The connectors A and B may be detached also by simply pulling back handle 4 upon disengagement of the release lever 5 from lever 3 since circular arc end face 25a of lever 3 is kept in contact with the working portion 5a of release lever 5 and causes the engagement piece 36b of locking arm 36 to be raised via the working portion 5a when handle 4 is pulled.

Thus, the feeding-side and receiving-side connectors A and B may be easily fitted and locked or detached by pushing them against each other or pulling them apart from each other in axial direction.

In the fully fitted and locked condition, the front end portion of casing 1 (1') of the feeding-side connector A is fitted in shell 43 of the receiving-side connector B and water-proof packing 48 is interposed between casing 1 (1') and connector body 42, while water-proof packing 48' is interposed between terminal accommodating chambers 7, 7', thus providing a double water-proof sealing.

Further, since the center axis of plunger 6a of the electromagnetic coil 6' for secondary locking the release lever 5 is provided such that it is deviated from that of lever shaft 24 of lever 3, plunger 6a is not damaged by an accidental rotation of lever 3 for locking since no direct force will be applied to plunger 6a. It is to be noted that the lever 3 can be mounted to connector body 2 instead of handle 4, opposing to the above embodiment.

Effect of the Invention

As described heretofore, according to the first embodiment of the present invention, a feeding-side connector and a receiving-side connector can be fitted very easily by rotating the lever with a substantially small force. Since a double locking mechanism is realized during the feeding operation, an inadvertent detachment of the mutual connectors can be securely prevented. Further, since the detachment thereof is performed in such procedures as; de-energizing the electromagnetic coil on completion of the feeding, releasing the secondary locking, and thereafter releasing the primary locking, the feeding-side connector is never inadvertently detached even after the feeding operation, and since the handle is made in a pipe-like shape to be used also as a lead wires distribution tube, a plurality of lead wires can be accommodated which is suitable to realize a multi-polarization of connector.

Furthermore, according to the second embodiment of the present invention, only when the feeding-side connector is preliminarily engaged with the receiving-side connector by a preliminary fitting means, a stopping means to hamper the connector body of the feeding-side connector from moving forward can be released thereby to enable rotational movement of the lever. By this effect, an inadvertent rotation of the lever when the both connectors are not mutually engaged yet can be prevented.

Having now fully described the invention, it will be apparent to one of ordinary skill in the art that many changes and modifications can be made thereto without departing from the spirit and scope of the invention as set forth herein.

What is claimed is:

1. A feeder connector including a feeding-side connector provided on the side of a feeder apparatus and a receiving-side connector provided on a vehicle body or the like, the feeding-side connector comprising;

a casing, a connector body slidably installed in a front half section of said casing and accommodating a plurality of terminals, a handle mounted in a rear half section of said casing, a lever which is rotatably supported at an intermediate portion thereof in said casing, and having a working portion at one side thereof extended to be pivotably attached to one of said handle and said connector body, and also having an operating portion at the other side thereof extended outside said casing, said lever, when rotated, causing the handle to move forwardly to bring said connector body into engagement with a mating connector body of said receiving-side connector a primary locking means for locking said lever in such a position that said connector body and said mating connector body are maintained engaged with each other, a secondary locking means for locking said primary locking means in the locked state, said secondary locking means comprising an electromagnetic coil provided at a position offset from a fitting axis of said connector body, and a means for releasing said lever from a primarily locked state thereof after said primary locking means is released from said secondary locking means through de-energizing of said electromagnetic coil.

2. A feeder connector as claimed in claim 1, wherein said handle is made in a pipe-like shape mounted in a rear half section of said casing, coaxially slidable with said connector body, said casing allowing leading wires connected to said plurality of terminals contained therethrough.

3. A feeder connector as claimed in claim 1, wherein said electromagnetic coil is provided with a plunger axially movable, on energizing said magnetic coil, into engagement in a corresponding bore formed on said lever.

4. A feeder connector as claimed in claim 1, wherein said primary locking means contains a hook-like portion extended in the axial direction of said connector body, being provided such that the lower face thereof is slidably contacted to said working portion of the lever for locking and/or releasing in accordance with a rotational movement of said lever, said primary locking means being formed integrally with said means for releasing said lever.

5. A feeder connector including a feeding-side connector provided on the side of a feeder apparatus and a receiving-side connector provided on a vehicle body or the like, the feeding-side connector comprising;

a casing, a connector body slidably installed in a front half section of said casing and accommodating a plurality of terminals, a handle mounted in a rear half section of said casing, a lever which is rotatably supported at an intermediate portion thereof in said casing, and having a working portion at one side thereof extended to be pivotably attached to one of said handle and said connector body, and also having an operating portion at the other side thereof extended outside said casing, said lever, when rotated, causing the handle to move forwardly to bring said connector body into engagement with a mating connector body of said receiving-side connector, a locking means for locking said lever in position such that said connector body and said mating connector body are maintained engaged with each other and having a release lever at one end thereof, and a preliminary fitting means for preliminarily fitting said casing to the receiving-side connector before connecting said connector body to said receiving-side connector; wherein said preliminary fitting means further includes a stopping means for hampering said connector body from moving forward to be connected to said receiving-side connector before being fitted thereto.

6. A feeder connector as claimed in claim 5, wherein said handle is provided in such a way as to allow leading wires connected to said plurality of terminals contained therethrough.

7. A feeder connector as claimed in claim 5, wherein said preliminary fitting means is rotatably supported at an intermediate portion thereof within said casing, and also contains a locking claw at one end thereof to be fitted with a corresponding engaging portion provided in said receiving-side connector and an engagement piece at the other end thereof that rotates in accordance with an activation of said release lever.

8. A feeder connector as claimed in claim 5, wherein said main body is further provided with a flange portion formed at the rear end of the external periphery thereof to be engaged with said stopping means.

* * * * *